United States Patent
Singh et al.

(10) Patent No.: US 12,373,174 B2
(45) Date of Patent: Jul. 29, 2025

(54) IDENTIFICATION OF CALLBACK FROM 2D APP TO RENDER 3D MODEL USING 3D APP

(71) Applicant: Lenovo (Singapore) Pte. Ltd., Singapore (SG)

(72) Inventors: Kuldeep Singh, Gurgaon (IN); Raju Kandaswamy, Coimbatore (IN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 94 days.

(21) Appl. No.: 17/820,017

(22) Filed: Aug. 16, 2022

(65) Prior Publication Data
US 2024/0061657 A1    Feb. 22, 2024

(51) Int. Cl.
*G06F 8/36* (2018.01)
*G06F 9/54* (2006.01)
*G06T 15/04* (2011.01)

(52) U.S. Cl.
CPC ............... *G06F 8/36* (2013.01); *G06F 9/547* (2013.01); *G06T 15/04* (2013.01)

(58) Field of Classification Search
CPC ............ G06F 8/36; G06F 9/547; G06T 14/04
USPC ......................................................... 717/120
See application file for complete search history.

(56) References Cited

U.S. PATENT DOCUMENTS

| | | | |
|---|---|---|---|
| 11,272,048 B1 * | 3/2022 | Wesselman | H04M 1/6066 |
| 2011/0157170 A1 * | 6/2011 | Bennett | H04N 21/4122 345/419 |
| 2014/0218472 A1 * | 8/2014 | Kim | H04N 13/376 348/43 |
| 2014/0359770 A1 * | 12/2014 | Lin | G06F 21/566 726/23 |
| 2017/0300214 A1 * | 10/2017 | Roundtree | H04L 51/08 |
| 2018/0144541 A1 * | 5/2018 | Champion | H04N 13/106 |
| 2018/0349108 A1 * | 12/2018 | Brebner | G06F 9/451 |
| 2020/0097259 A1 * | 3/2020 | Zhang | G06F 11/302 |
| 2020/0104040 A1 * | 4/2020 | Morris | G06F 3/04883 |
| 2020/0134777 A1 * | 4/2020 | Yamamoto | G06T 19/20 |
| 2021/0409554 A1 * | 12/2021 | Ito | H04N 1/00209 |
| 2023/0290075 A1 * | 9/2023 | Ma | G06Q 20/342 |
| 2023/0367953 A1 * | 11/2023 | Mercier | G06F 40/106 |

OTHER PUBLICATIONS

"ThinkReality A3 Industrial Edition Applications Overview", Lenovo Webpage, Retrieved on Jul. 6, 2022 from https://support.lenovo.com/us/en/videos/nvid500337.

(Continued)

*Primary Examiner* — Bradford F Wheaton
(74) *Attorney, Agent, or Firm* — John M. Rogitz; John L. Rogitz

(57) ABSTRACT

In one aspect, a device includes at least one processor and storage accessible to the at least one processor. The storage includes instructions executable by the at least one processor to execute a software development kit (SDK) to interface between a two-dimensional (2D) application (app) and a three-dimensional (3D) app. The instructions are also executable to identify, via the SDK, a callback from the 2D app. The callback indicates a uniform resource locator (URL) associated with a 3D model. The instructions are further executable to execute the SDK to indicate, to the 3D app, the 3D model for rendering in 3D space.

20 Claims, 7 Drawing Sheets

(56) References Cited

OTHER PUBLICATIONS

Singh, Kuldeep, "Enterprise XR—Multi-Factor Authentication", Mar. 25, 2020. Retrieved on Jul. 6, 2022 from https://thinkuldeep.com/post/enterprise-xr-multi-factor-authentication/.

Singh, Kuldeep, "Try everything in your space—WebXR", Nov. 29, 2021. Retrieved on Jul. 6, 2022 from https://thinkuldeep.com/post/try-everything-in-your-space-webxr/.

* cited by examiner

IDENTIFICATION OF CALLBACK FROM 2D APP TO RENDER 3D MODEL USING 3D APP

FIELD

The disclosure below relates to technically inventive, non-routine solutions that are necessarily rooted in computer technology and that produce concrete technical improvements. In particular, the disclosure below relates to techniques for identification of a callback from a two-dimensional (2D) application (app) to render a three-dimensional (3D) model using a 3D app.

BACKGROUND

As recognized herein, 2D apps are designed to show 2D content and 3D apps are designed to show 3D content. The disclosure below also recognizes that to show 2D content in 3D settings, such as to show a PDF document or website, the 3D app developer currently has to build 3D screens with 3D tools that may or may not even exist in order to show the 2D content, rather than using 2D software development tools. As also recognized below, building these 3D tools can be very time consuming and technically complex. As even further recognized below, there is currently no adequate way to allow developers to build 3D apps as needed for 3D content but still build 2D screens for 3D implementations using their preferred and technologically robust 2D tools. As such, there are currently no adequate solutions to the foregoing computer-related, technological problems.

SUMMARY

Accordingly, in one aspect a device includes at least one processor and storage accessible to the at least one processor. The storage includes instructions executable by the at least one processor to execute a software development kit (SDK) to interface between a two-dimensional (2D) application (app) and a three-dimensional (3D) app. The instructions are also executable to identify, via the SDK, a callback from the 2D app. The callback indicates a uniform resource locator (URL) associated with a 3D model. The instructions are also executable to execute the SDK to indicate, to the 3D app, the 3D model for rendering in 3D space.

In certain example implementations, the instructions may be executable to execute the 3D app to download the 3D model via the URL as indicated by the SDK. For example, the URL may include an intent URL and the instructions may be executable to use the intent URL to identify a file path at which the 3D model is downloadable so that the instructions may then be executable to execute the 3D app to download the 3D model via the file path. The instructions may then be executable to execute the 3D app to render the 3D model.

Also in some example implementations, the instructions may be executable to execute a browser via the SDK to identify the callback, where the browser may communicate with the 2D app. The browser may include a webview (e.g., Android WebView), for example.

Still further, in some examples the instructions may be executable to receive user input selecting a selector presented via the 2D app and initiate the callback based on receipt of the user input selecting the selector.

In various examples, the SDK may be integrated into the 3D app. Also in various examples, the 2D app may be configured to present visual content in pixel coordinates, and the 3D app may be configured to present 3D content stereoscopically. Thus, e.g., the 3D app may be configured to present 3D content stereoscopically in texture coordinates.

In another aspect, a method includes executing a software development kit (SDK) to interface between a two-dimensional (2D) application (app) and a three-dimensional (3D) app. The method also includes identifying, via the SDK, a callback from the 2D app. The callback indicates a uniform resource locator (URL) associated with a 3D model. The method also includes executing the SDK to indicate, to the 3D app, the 3D model for rendering in 3D space.

Accordingly, in some examples the method may include executing the 3D app to download the 3D model via the URL as indicated by the SDK. The URL may include an intent URL, and here the method may include using the intent URL to identify a file path at which the 3D model is downloadable and then executing the 3D app to download the 3D model via the file path. The method may even then include executing the 3D app to render the 3D model.

Still further, also in some examples the method may include executing a browser via the SDK to identify the callback, where the browser may communicate with the 2D app. The browser may include webview, for example.

Also in certain examples, the method may include executing the SDK as part of executing the 3D app. So, for example, the method may include executing the 3D app to identify user input to the 2D app, passing the user input to the 2D app, executing the 2D app based on the user input to generate the callback, and then executing the SDK to identify the callback.

In still another aspect, at least one computer readable storage medium (CRSM) that is not a transitory signal includes instructions executable by at least one processor to execute software code to interface between a two-dimensional (2D) application (app) and a three-dimensional (3D) app. The instructions are also executable to identify, via the software code, data associated with the 2D app. The data indicates a location associated with a 3D model. The instructions are then executable to execute the software code to indicate, to the 3D app, the 3D model for rendering in 3D space.

Thus, in certain example embodiments the software code may include a software development kit executed as part of execution of the 3D app, the data may include a callback, and the location may be indicated via a uniform resource locator (URL).

The details of present principles, both as to their structure and operation, can best be understood in reference to the accompanying drawings, in which like reference numerals refer to like parts, and in which:

DETAILED DESCRIPTION

Figure 1:
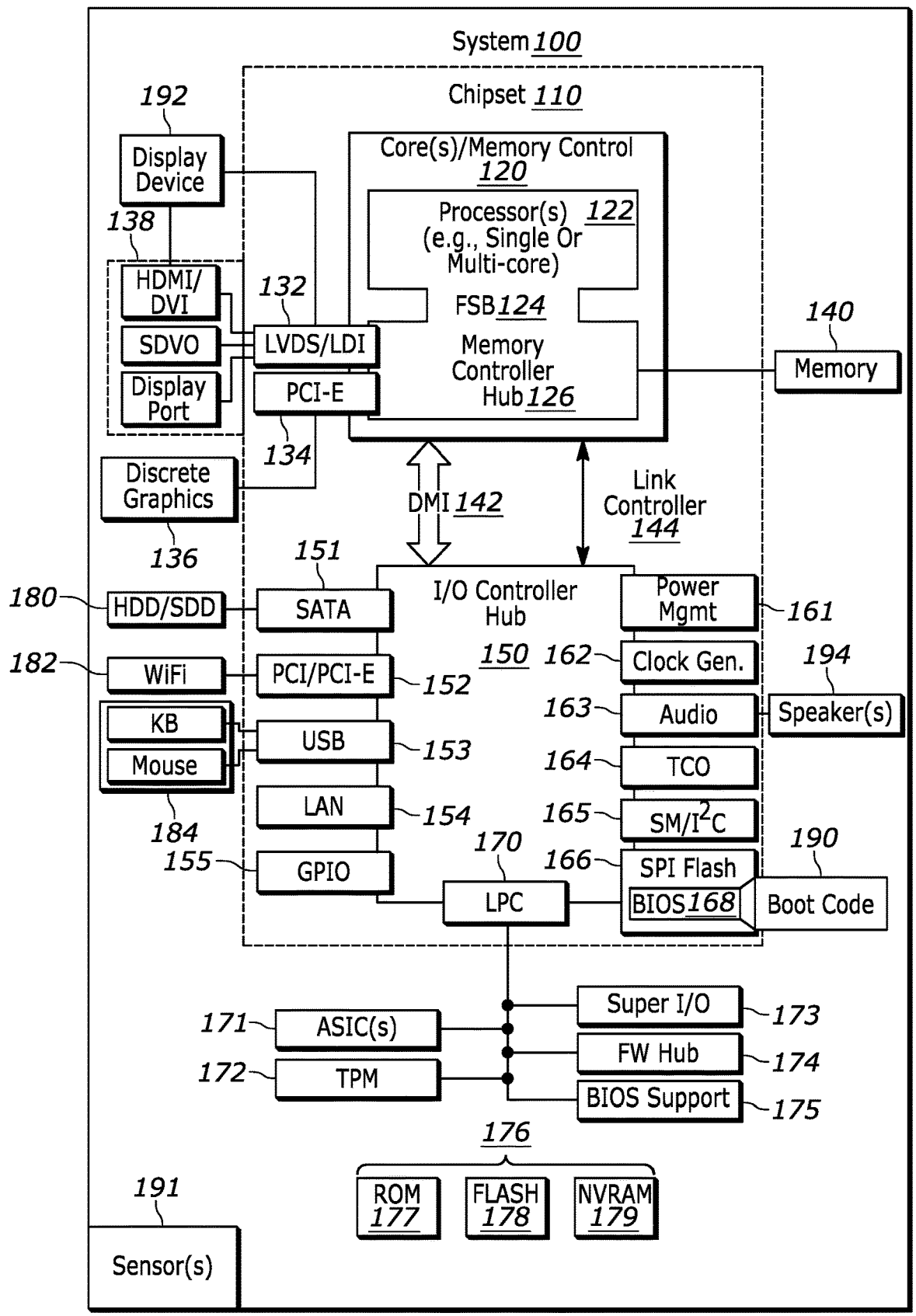
FIG. 1 is a block diagram of an example system consistent with present principles.

Among other things, the detailed description below recognizes that it is desirable for 2D mobile apps (designed for 2D space rendered on a flat screen display as may be built using a mobile device SDK such as Android's SDK) to be run in a 3D virtual environment in cross-compatible fashion. The 2D app might be Google's Chrome or Microsoft's Teams, for example. The detailed description below further recognizes that it is desirable to not require 2D app programmers to change the functioning of the 2D app itself as this is technologically complex if even possible given the numerous different types of 3D SDKs used in different headsets as the 3D SDKs are often manufacturer-specific. Likewise, the detailed description below recognizes that it is desirable to not require the 3D SDK programmers to change the functioning of the 3D SDK itself as this too is technologically complex and inhibiting.

App Space is therefore discussed below as an example of an app/SDK that may be used to make immersive 3D interactions possible for 2D apps. App Space may therefore be a mobile-based app and user interface that renders the 2D apps in a spatial environment and takes care of converting coordinates for the spatial coordinate system to coordinates for the 2D coordinate system in runtime. An app repositioning system is also disclosed as part of App Space to place the apps in three-dimensional spatial environment. Converted interactions can be extended to all the 3D interactions provided by the underlying SDK for the headset, such as raycast, scroll, swipe, long-press, double tap, gesture and voice.

Thus, in one example App Space may first render the 2D app(s) in a 3D spatial environment so that the rendered apps appear floating in front of the user, e.g., in square orientation. Then, when the user performs an interaction using 3D spatial methods, App Space converts the 3D interaction method and the 3D spatial coordinates at which the interaction occurred to a 2D coordinate system and interaction method recognizable by the 2D mobile app.

Accordingly, App Space may intercept the 3D AR coordinates from a 3D cursor and convert them to 2D coordinates, and covert all AR interactions such as AR clicks, AR scrolls, and AR text input to 2D app interactions such as "phone touches"/keyboard events. This architecture of App Space may therefore be flexible and leverage the capability of the headset's underlying 3D SDK, native APIs and 3D engine, making App Space's architecture open for many different platforms. In some specific examples, App Space may even be established by a 3D Container App for 2D/3D conversion, the underlying native 3D SDK of the headset itself for stereoscopic rendering and identifying/processing 3D user inputs (e.g., Lenovo's A3 Home and/or Unity), and an App Space Service. The components of coordinate conversion, square orientation, interactions, and other aspects mentioned below may work for other platforms too (e.g., not just Android-based mobile devices but also Mac and Linux-based devices using appropriate programming code for those other platforms).

It may therefore be appreciated that a 3D version of a 2D app need not exist for 3D rendering, and that nothing in the underlying 2D app itself need be customized either. Instead, the 2D app/content may be rendered in a 3D container, and the 2D app may not even know that it is being rendered in 3D space. Rather, the 2D app continues to assume it is operating per 2D pixel coordinates.

Interactions in 3D using App Space may be done per the following examples:

As one example, a 3D pointer, such as a cursor located in the center of the user's field of view (FOV) like a 3D Gaze pointer or a Raycast emanating from an attached device (e.g., phone), may be used and serve as a 3DoF controller.

Other selection methods may include a touchpad on a phone/mobile screen that accepts tap and swipe inputs (e.g., provided by a 2D companion app), a hardware button located on the attached compute/mobile device (e.g., phone, compute pack, etc.), hand gestures, and voice commands.

Keyboard key presses may also be used, such as from Android's native on-screen keyboard or from an AR keyboard.

When an interaction event occurs, App Space may do the following in various examples:

First, convert the coordinates of the 3D pointer (cursor or raycast) to corresponding screen coordinates.

Convert the 3D selection method (tap, scroll, etc.) to one understandable by the 2D app.

Inject the respective interaction event to the underlying 2D app.

In the case of key press, these events may be received either via native on-screen keyboard or via AR keyboard and may be injected to the currently-selected text input field of the 2D app's virtual display.

AppSpace may thus convert 3D coordinates to 2D screen coordinates so that it can covert AR interactions to touch screen interactions. As for the coordinate conversion itself, note that App Space may intercept the 3D spatial coordinates (e.g., from the headset's manufacturer-provided SDK) and convert them to 2D coordinates. Also note here that App Space may not just convert 3D coordinates to 2D coordinates to provide to the 2D app running on the mobile device but may also convert 2D coordinates from the 2D app itself into 3D coordinates for passing back to the headset's 3D SDK for 3D renderings.

Before describing the coordinate calculations in detail, also note more generally that for the virtual display 2D source coordinate system, Android images may be formed by pixels and represented in the pixel coordinate system. As for the 3D spatial coordinate system, 3D textures may be bitmap images that have different origin and axis arrangements. Thus, in order to perform clicks or selections on the 2D app at the correct places (e.g., represent 3D eye gaze select actions as 2D touch events to the 2D app), a physics raycasting may be done on the 3D texture to obtain the 3D coordinates that the user is looking at. Then, with the mobile device knowing the 3D coordinates, a coordinate conversion may be performed from 3D texture space into 2D pixel space using the following functions:

Pixel X=F(Texture X), where F=(0.5+Texture X)*W
Pixel Y=F(Texture Y), where F=(0.5−Texture Y)*H For example, (−0.3,0.2) in texture space would translate to (216, 576) as calculated below, given that width=1080 and height=1920:

Pixel X=(0.5+(−0.3))*1080=216
Pixel Y=(0.5−(0.2))*1920=576

Also note that the reverse calculation of (216,576) in 2D pixel space may translate into (−0.3,0.2) in texture space as given by the following functions:

Texture X=F(Pixel X), where F=(Pixel X/W)−0.5
Texture Y=F(Pixel Y), where F=0.5−(Pixel Y/H)

With the coordinate conversions themselves being set forth, immersive interactions for which the conversions may be used will now be discussed.

Interactions in 3D space (that may be translated to 2D interactions using App Space) may occur using any number of different 3D input modalities, including but not limited to gaze pointer, raycast, hand/arm gestures, and voice input. These interactions and input modalities may be supported for any 3D app using the headset manufacturer's SDK (e.g., the ThinkReality SDK) and/or App Space itself. Events may thus be injected via Virtual Display APIs to the underlying 2D app. Below are descriptions of how different interactions may be performed in App Space or whatever 3D to 2D conversion app is being used.

For click/select interactions, App Space may inject a finger touch event at pixel coordinates converted from the cursor pointer location in Unity when a gaze select event or companion app tap event or other event occurs. The following is Android code for the injection:

```
public void click(int displayID, final int x, final int y) {
    long 10owntime = SystemClock.uptimeMillis( );
    //These injectMotionEvents is to perform Tap
    injectMotionEvent(displayID, MotionEvent.ACTION_DOWN, 10 owntime, 10owntime, x, y);
    long eventTime = SystemClock.uptimeMillis( );
    injectMotionEvent(displayID, MotionEvent.ACTION_UP, 10 owntime, eventTime, x,y);
}
```

For longpress interactions the long press may be supported by long-pressing of a button on the headset (e.g., the Lenovo A3 glass Center Key button) for a threshold amount of time such as two seconds, or a longpress on the companion mobile app/display/trackpad. App Space may then inject finger touch events (ACTION_DOWN using finger, hold it down and then after a delay lifting finger using ACTION_UP) according to the following Android code:

```
public void longPress(int displayID, final int x, final int y) {
    long 10owntime = SystemClock.uptimeMillis( );
    injectMotionEvent(displayID, MotionEvent.ACTION_DOWN, 11 owntime, 11owntime, x, y);
    Thread.sleep(ViewConfiguration.getLongPressTimeout( ) + LONG_PRESS_TIMEOUT_BUFFER);
    11owntime = SystemClock.uptimeMillis( );
    long eventTime = SystemClock.uptimeMillis( );
    injectMotionEvent(displayID, MotionEvent.ACTION_UP, 11 owntime, eventTime, x, y);
}
```

For back button interaction, back functionality may be supported in an AR user interface (UI) at the headset (e.g. Lenovo A3 using App Space) as well from the 2D companion app/mobile device itself. App Space may thus inject a keyboard event with KEYCODE_BACK into the 2D app as follows:

```
public void goBack(int displayID) {
    serviceConnection.injectKeyEvent(new KeyEvent(ACTION_DOWN, KEYCODE_BACK), displayID);
    serviceConnection.injectKeyEvent(new KeyEvent(ACTION_UP, KEYCODE_BACK), displayID);
}
```

Note that similar programming language and a corresponding keycode may be used for a "close" command to close a window or other graphical object.

For scroll interactions, scrolling may be supported in an AR UI at the headset (e.g., Lenovo A3 using App Space) by injecting mouse scroll events (ACTION_SCROLL for TOOL_TYPE_MOUSE). Thus, AR UI scrolls via Scroll Up/Down buttons may be performed as a fixed-step scroll. Scrolling from the 2D companion app trackpad or touch-enabled display (e.g., up/down/left/right scroll gestures) may also be supported as continuous scrolls and App Space may thus inject scroll events based on the velocity and distance covered on trackpad.

For double tap/double-click interactions, double taps on the 2D companion app/mobile device display may also be supported similar to the click/select interactions set forth above but to establish a 2D double tap.

Turning now to text input modalities for conversion to 2D coordinates for passing of text input to the 2D app on the mobile device, the initial text input may be performed via an on screen 3D keyboard in AR/VR as presented at the headset, or via a keyboard as presented on the display of the mobile device. If the input is provided to the native 3D keyboard or to the mobile device keyboard, the key input for whatever key is selected may be passed to the 2D app. For input to a keyboard from a 2D app executing at the mobile device (or from the mobile device itself) but as presented in 3D virtual space on the headset display, App Space may intercept all the key events and inject to the focused Virtual Display using Android's virtual display APIs according to the coordinate conversions discussed above (e.g., based on the 3D coordinates of a gaze pointer or raycast being used for key selection).

Still in terms of different 3D user interactions that may be injected into a 2D app as a 2D action, the following table further illustrates. This table may be thought of as a key map indicating how various user interactions are converted to Android terms for injection into an Android-based 2D app even with square mode enabled. Thus, the table below sets forth various events and their corresponding Android mapping. The Android Key codes may be provided through the Android SDK. Thus, the appropriate events may be generated programmatically for each type of user interaction indicated in the event column as follows:

| Event | Android Key Code | Comments |
| --- | --- | --- |
| Click | MotionEvent.ACTION_DOWN<br>MotionEvent.ACTION_UP | Two motion events are programmatically generated and passed on, first event ACTION_DOWN followed by ACTION_UP |
| Hover | MotionEvent.ACTION_HOVER_MOVE | Whenever gaze movement is detected over the AppSpace canvas an ACTION_HOVER_MOVE event is programmatically generated and fired |
| Keyboard | KeyEvent.ACTION_DOWN<br>KeyEvent.ACTION_UP | Whenever a key is pressed in AR Keyboard, two key events are generated and fired programmatically, ACTION_DOWN followed by ACTION_UP. Both events will also have the same key code of the key being pressed. For example, for the enter key press, "KeyEvent.KEYCODE_ENTER" will be present in both ACTION_DOWN and ACTION_UP |
| Long Click | MotionEvent.ACTION_DOWN<br>Thread.Sleep(200)<br>MotionEvent.ACTION_UP | Similar to click, but in between ACTION_DOWN and ACTION_UP, a programmatical delay (sleep) of 200 ms is introduced to simulate interval |
| Back | KeyEvent.ACTION_DOWN<br>KeyEvent.ACTION_UP | Similar to keyboard events, but the generated event will have the key code as KeyEvent.KEYCODE_BACK |
| Horizontal Scroll | MotionEvent.AXIS_HSCROLL<br>MotionEvent.ACTION_SCROLL | First AXIS_HSCROLL will be called to set the amount of scroll followed by the ACTION_SCROLL programmatically |
| Vertical Scroll | MotionEvent.AXIS_VSCROLL<br>MotionEvent.ACTION_SCROLL | First AXIS_VSCROLL will be called to set the amount of scroll followed by the ACTION_SCROLL programmatically |
| Fling | MotionEvent.ACTION_DOWN<br>MotionEvent.ACTION_MOVE<br>MotionEvent.ACTION_UP | First ACTION_DOWN followed by a bunch of ACTION_MOVE and finally ACTION_UP. All events generated and fired programmatically |
| Double Tap | MotionEvent.ACTION_DOWN<br>MotionEvent.ACTION_UP | Similar to click, but fired twice in short intervals programmatically |

Furthermore, App Space as may be used in a ThinkReality A3 (or other headset) may not only show native 2D app screens in 3D but also have a communication mechanism to communicate with the 2D app to develop a seamless 2D and 3D experience where developers can build 3D apps but still build 2D screens in their favorite 2D tools.

Thus, App Space may be made available for various headsets and can be used to combine the 2D and 3D developer experience. It can be part of a headset SDK, for example. App Space may thus allow including any existing 2D app screen within it so that developers are free to develop 2D apps in their favorite tools and 3D apps in their favorite 3D development tools. This way, 3D apps can have seamless communication between 2D and 3D by the SDK-provided interfaces.

Accordingly, a native 2D WebView from Android may be wrapped in App Space. In various examples, WebView may be a native Android implementation. As a 2D screen implemented by an Android developer, it can load any website, intercept the Android scene viewer URLs, download the linked 3D model, and notify App Space. App Space as possibly integrated into the 3D app itself can then let 3D developers handle the event and open the 3D model in the 3D app.

A 2D screen may thus be opened in the 3D app and both the 2D screen and 3D app may co-exist within the same app, bringing the best of both 2D and 3D worlds together.

Similarly, App Space as an SDK component can expose an interface between the underlying 2D app and the 3D app, communicate/broadcast events which App Space listens to and reacts from, or visa versa. The 3D app can then handle these events and perform whatever its developer programs it to do in 3D.

Thus, as an example an e-commerce or retailer website may directly publish 3D content on its website and serve them in XR/AR/VR devices like Lenovo's ThinkReality A3.

Accordingly, in one specific example, the development tool Unity3D may be used for building AR/VR applications and provide ways to design and develop applications for a 3D environment. This might include 2D screens for pictures, videos, pdf/text documents, and other graphical items. App Space may thus be used to render 2D app screens in AR glasses and other headsets, making immersive AR interactions possible for 2D apps screens. App Space may also be extended as a developer tool for Unity3D and other development tools so that, using it, developers can bring any 2D content/screen from existing 2D phone apps to within the 3D AR/VR application. This may enable 3D app developers to reuse existing 2D app screens, and design and develop a hybrid experience. Thus, App Space Solution may include a 3D app package and mobile service that brings 2D apps in a 3D space and bring any 2D screen from the phone app in 3D scene, and/or show 2D content like video, text, a webpage, or an image from the 2D phone app by placing them in 3D. 3D apps can include 2D app screens and have seamless communication between 2D and 3D by ThinkReality SDK-provided interfaces (e.g., App Space-provided interfaces). Thus, a 2D screen may be opened in a 3D app and both 2D and 3D apps can co-exist.

Figure 7:
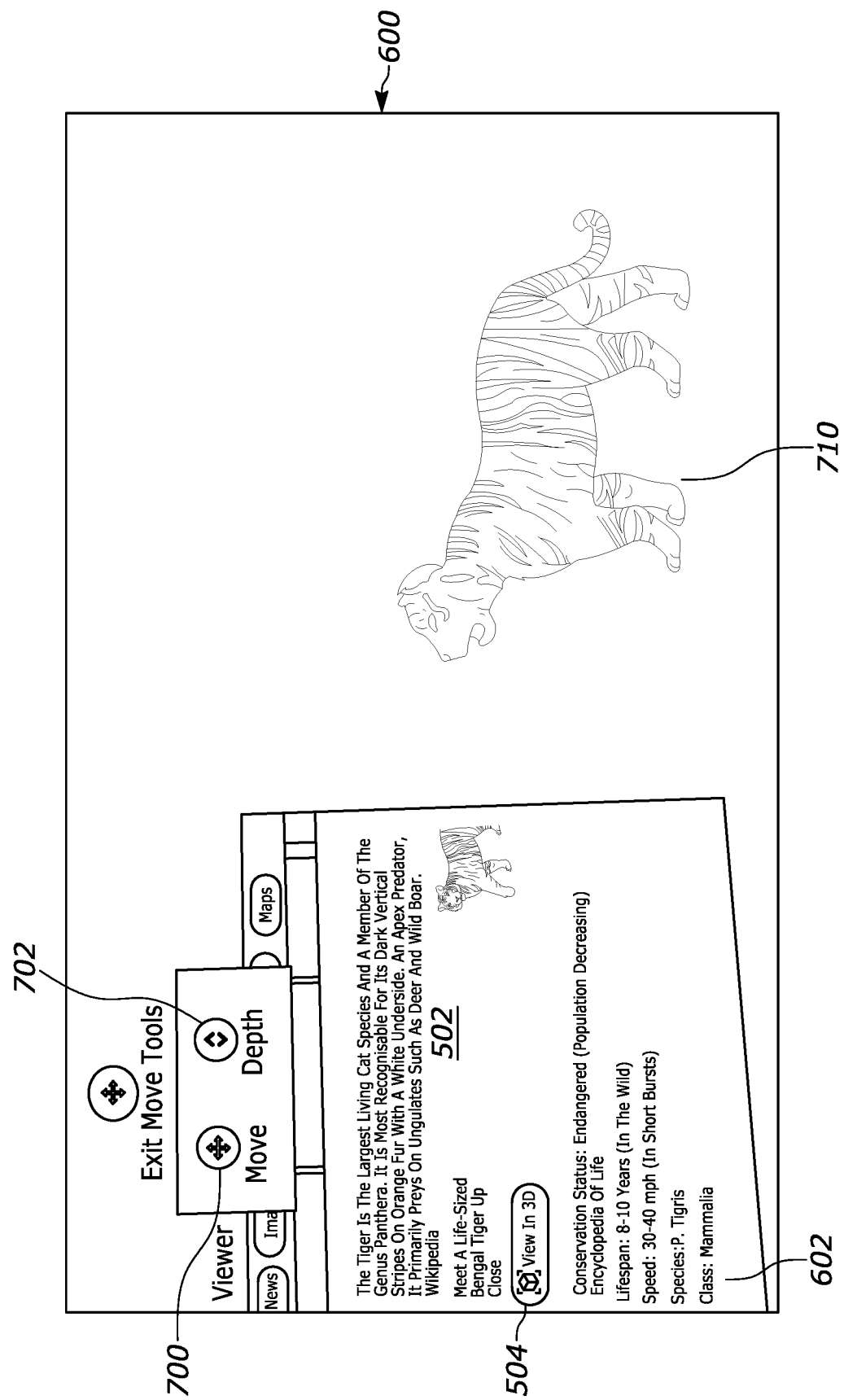
FIG. 7 shows an example 3D model that may be presented at the headset responsive to selection of the "view in 3D selector" consistent with present principles.

For example, using AppSpace as a developer tool, a 3D model viewer can be built and be accessible directly with web content, browsing from a webpage in 3D. As an example, if one were to search "tiger" on Google's webpage in WebView opened via App Space, it will show a page as shown in FIG. 7 and described further below. The Google search results might also show "View in 3D" if the phone supports it, and so clicking on this would open the 3D model in the phone in AR as a default behavior. But to open the same 3D model in a headset, App Space as a developer tool can make this possible since upon clicking "view in 3D" the 2D app may notify the 3D app about the 3D model content availability by raising a callback event using an operating system (e.g., Android) application programming interface (API). Then on listening to the callback event, Unity3D or whatever 3D model viewer is being used can show this 3D model content in AR glasses (or another headset type) using Unity 3D. In some examples, these processes may also include preventing the 2D app from also opening/rendering the 3D model at the phone's own display to conserve on processor and power resources since it will already be rendered at the headset's display.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, solid state drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include one or more sensors 191. The sensors 191 may include, for example, one or more cameras that gather images and provide the images and related input to the processor 122. The camera(s) may be webcams and/or digital cameras, but may also be thermal imaging cameras, infrared (IR) cameras, three-dimensional (3D) cameras, and/or cameras otherwise integrated into the system 100 and controllable by the processor 122 to gather still images and/or video. Thus, for example, one or more forward-facing cameras might be on a headset being worn by a user so that the system 100 may execute computer vision (e.g., for 3D real-world location tracking), and one or more inward-facing cameras might also be on the headset for eye tracking.

In addition to or in lieu of the foregoing, the sensors 191 may include one or more inertial measurement sensors that might be included in an inertial measurement unit (IMU) for location tracking and device orientation identification (e.g., dead reckoning for location tracking, orientation identification to determine whether to present content in landscape or portrait orientation). For example, the system 100 may be embodied in a mobile device and the inertial measurement sensors may be located on the mobile device to determine whether the user is holding the system 100 in portrait orientation where the long axis of the device/display is oriented vertically or in landscape orientation where the long axis of the device/display is oriented horizontally. Example inertial measurement sensors include magnetometers that sense and/or measure directional movement of the system 100 and provide related input to the processor 122, gyroscopes that sense and/or measure the orientation of the system 100 and provide related input to the processor 122, and accelerometers that sense acceleration and/or movement of the system 100 and provide related input to the processor 122.

Additionally, though not shown for simplicity, in some embodiments the system 100 may include an audio receiver/microphone that provides input from the microphone to the processor 122 based on audio that is detected, such as via a user providing audible input to the microphone as a voice command as described herein. The system 100 may also include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
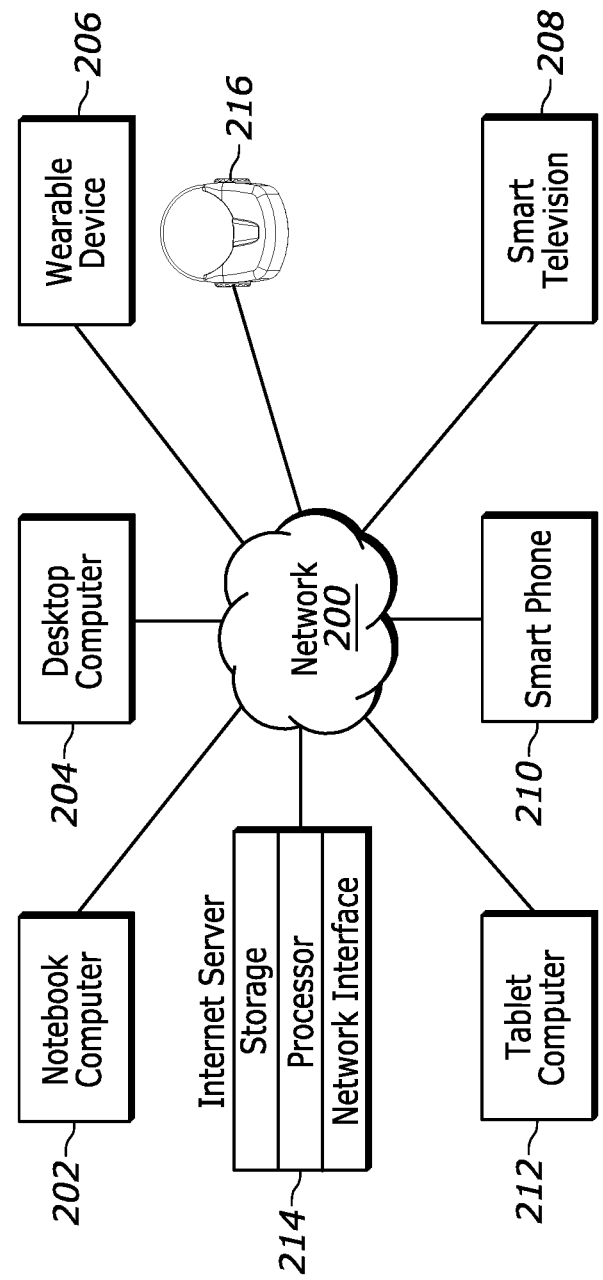
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212, 216. It is to be understood that the devices 202-216 may be configured to communicate with each other over the network 200 to undertake present principles.

Figure 3:
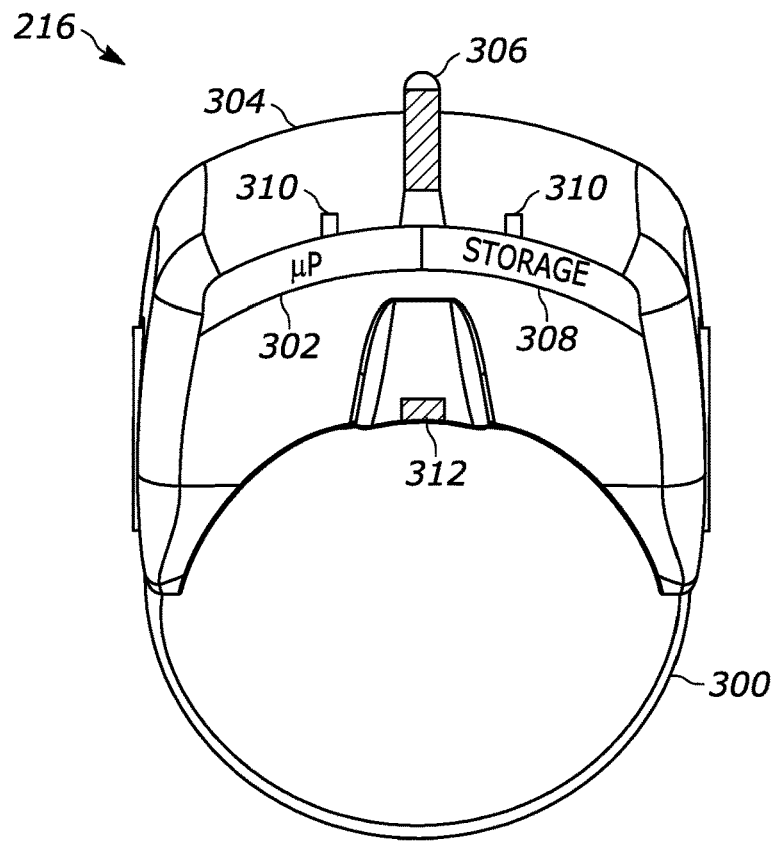
FIG. 3 illustrates an example headset that may be used to present an AR, MR, or VR presentation consistent with present principles.

Now describing FIG. 3, it shows a top plan view of an example headset consistent with present principles, such as the headset 216 referenced above. The headset 216 may include a housing 300, at least one processor 302 in the housing 300, and a non-transparent or transparent "heads up" display 304 accessible to the at least one processor 302 and coupled to the housing 300. The display 304 may for example have discrete left and right eye pieces as shown for presentation of stereoscopic images and/or 3D virtual images/objects using augmented reality (AR) software, virtual reality (VR) software, and/or mixed reality (MR) software.

The headset 216 may also include one or more forward-facing cameras 306. As shown, the camera 306 may be mounted on a bridge portion of the display 304 above where the user's nose would be so that it may have an outward-facing field of view similar to that of the user himself or herself while wearing the headset 216. The camera 306 may be used for SLAM, computer vision, image registration, spatial mapping, etc. to track movements of the wearer/headset 216 within real-world space and map the movements to virtual space. The camera 306 may also be used for gesture recognition to recognize gestures made by the user using their hand, arm, etc. consistent with present principles. However, further note that the camera(s) 306 may be located at other headset locations as well. Also note that in some examples, inward-facing cameras 310 may also be mounted within the headset 216 and oriented to image the user's eyes for eye tracking while the user wears the headset 216 (e.g., to determine where a user is looking in 3D space to select a real world or graphical object).

Additionally, the headset 316 may include storage 308 accessible to the processor 302 and coupled to the housing 300, a microphone 312 for detecting audio of the user speaking voice commands, and still other components not shown for simplicity such as a network interface for communicating over a network such as the Internet and a battery for powering components of the headset 216 such as the camera(s) 306. Additionally, note that while the headset 216 is illustrated as a head-circumscribing VR headset, it may also be established by computerized smart glasses or another type of headset including other types of AR and MR headsets. For example, the headset may be established by an AR headset that may have a transparent display that is able to present 3D virtual objects/content.

Before describing FIG. 4, it is to be understood that an app sometimes called App Space/AppSpace below may handle coordinate conversions and action/event translations between a headset's own SDK that might be provided by the headset's manufacturer (and that presents 3D content stereoscopically and manages 3D user interactions) and a 2D app operating on a connected smartphone. Thus, App Space may make immersive AR/VR/MR interactions possible for 2D apps that have not been configured for 3D space. App Space may therefore render the 2D apps in a 3D spatial environment, as well as convert 3D coordinates in the 3D spatial coordinate system into 2D coordinates in the 2D coordinate system at runtime (and vice versa). Thus, an app repositioning system is enabled by App Space to place the 2D apps in the 3D spatial environment (e.g., in square orientation by default). App Space's coordinate conversions can be extended to all the interactions afforded by the underlying 3D headset SDK, such as raycast, scroll, swipe, long-press, double tap, gesture and voice.

Figure 4:
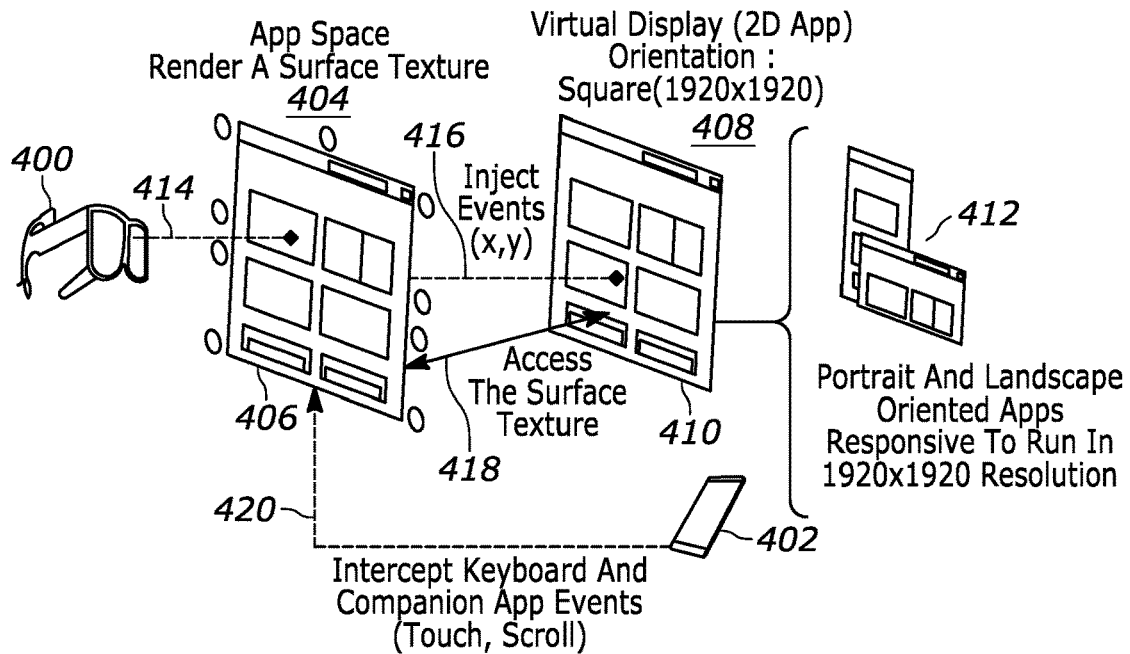
FIG. 4 is a schematic of example hardware and software architecture for content rendering consistent with present principles.

Now specifically in reference to FIG. 4, it shows a schematic of example hardware and software architecture. Thus, a headset 400 is shown and may be similar to the headset 216 described above. A mobile device 402 is also shown, where the mobile device 402 may be a smartphone, tablet computer, laptop computer, or other computing device.

FIG. 4 also shows that a first app 404—App Space in non-limiting examples—may execute at the device 402 to stereoscopically render a surface texture/canvas 406 in 3D coordinates on the display of the headset 400 and hence to a wearer of the headset 400. The device 402 may also execute a second app 408 that is already configured to present content in 2D coordinates on the display of the device 402 itself. Thus, the 2D app may be executed for the device 402 to present a virtual display 410 in, for example, square orientation in 1920×1920 pixel format by default once portrait and/or landscape-oriented presentations 412 of the 2D app have been converted into square orientation by the device 402 (e.g., by App Space itself, by the guest operating system such as Google's Android, by another app executed by the GOS such as a news app or weather app that accesses the internet to present visual content and is running on the device 402, and/or by APIs of Android (an Android Virtual Display Service)). The content of the virtual display 410 may then act as the base for the content of the surface texture/canvas 406 that is rendered in 3D, with it being reiterated that the virtual display 410 may be generated by the guest operating system (GOS) of the mobile device itself (e.g., Android). The virtual display 410 (and by extension, the texture/canvas 406) may also have the same frame rate (e.g., 60 Hz) as the frame rate for the underlying 2D app itself as would be used to present the 2D app's content on the mobile device's own display.

Thus, as shown by line 414, the surface texture 406 is projected into the user's 3D view while wearing the headset 400 (by App Space 404 itself or after App Space 404 provides the surface texture 406 to the headset's own 3D SDK app for 3D rendering (which may be a separate app than App Space itself)), with App Space 404 initially accessing/generating the surface texture/canvas 406 using the virtual display 410 of the 2D app 408 (as demonstrated by line 418). Additionally, 3D events and actions taken by the user in 3D space while interacting with the 3D virtual environment may be injected into the 2D virtual display space 410 running on the device 402 in x,y pixel coordinates once converted into those coordinates by App Space 404, as demonstrated by line 416. App Space 404 may also intercept keyboard and other app events executing at the companion 2D app 408 and represent them in the 3D surface texture 406, as represented by line 420. For instance, touches to the touch-enabled display of the device 402 may be intercepted, as may scroll events.

Accordingly, as understood herein, in non-limiting examples App Space 408 may be a 3D app package and mobile service that bring 2D apps into a 3D space app. The App Space service may wrap underlying OS Virtual Display application programming interfaces (APIs). 2D apps may be opened in the secondary virtual display 410 for which the surface texture is accessible to App Space in a 3D engine. App Space may thus render the surface texture 406 in 3D space and manage the texture 406 with additional user interface (UI) controls. App Space may detect gaze, raycast, keyboard, and keypress events from any buttons on the head-mounted headset 400 itself or even other controller devices (such as 3D hand-held controllers) via the headset's own SDK for 3D rendering. All the detected events may then be injected to the respective virtual display 410 at the intercepted coordinates and thus to the underlying 2D app 408.

Also note that, using App Space, multiple 2D apps can be rendered at the headset 400 concurrently and placed in the 3D space along a 360-degree field of view for the user's convenience. Thus, the 2D apps may be assigned a spatial anchor in 3D coordinates to keep the 2D content virtually presented in 3D at a particular real world location (for AR) or virtual world 3D location (for VR).

Thus, in one example embodiment per the schematic of FIG. 4, the following environment may be used (although present principles may also be extended to other setups as well). First, the head mounted display device 400 itself may be a Lenovo ThinkReality A3 device. The 3D engine that is used may be the Unity 3D engine. The headset SDK itself may be the Android SDK and/or Lenovo ThinkReality SDK. The controlling software may be the app running on the device 402, such as App Space itself. In the present non-limiting example, the computing device 402 itself is a Motorola g100 running a version of the Android operating system (OS). The virtual display technology that is used may be Android Virtual Display and/or native APIs from the underlying OS (e.g., Virtual Display APIs from underlying OS/Native layer such as Android).

With the foregoing in mind, in non-limiting examples AppSpace may be an SDK component and may be used so that any 2D app developer can build a separate 3D app incorporating/using existing 2D screens they have already built for the 2D app rather than building the screens anew specifically for the 3D app.

For example, suppose a 3D model developer has developed a 3D model such as a demo 3D model of a tiger. App Space may be delivered to developers as an SDK so that they can then build/incorporate a webview in the 3D app. An Android WebView may be used, for example, to present a 2D screen in the 3D app, with WebView being a Chrome-like browser as already provided by Google as a component of an Android guest operating system executing at a mobile device that may be used to control both the 2D app and 3D app at the mobile device.

Thus, App Space as an SDK may open the webview in the 3D app (e.g., with the SDK being integrated into the 3D app itself), intercept a URL associated with a selector presented via the webview, and download a 3D model behind the scenes that is associated with the URL. The 3D app may then be used to open this 3D model (e.g., that the webview itself might otherwise be opening to present at the mobile device display if the mobile device has AR capability like a smartphone with AR capability).

Thus, the device need not necessarily let the browser/webview 2D app itself open the 3D model (though it too may open the model in some examples for presentation on a display of the mobile device itself). Instead, the 3D app developer may customize the 3D app using the App Space SDK to open the 3D model in their own desired way in 3D. The App Space SDK may thus intercept the URL and pass the URL/other data back to the 3D app/3D world since it exists logically as an interface between the 2D app and the 3D app/environment. The App Space SDK may therefore establish a communication channel between the 2D and 3D apps via inter-process communication (IPC) so that whenever a 2D browser has detected a 3D model, it may communicate through IPC with the 3D app/3D world to indicate that there is a 3D model available for download and rendering. The 3D app ultimately receives/intercepts the message and based on the message it may receive the model and/or download the model to render in 3D stereoscopically at a headset.

For example, a user may open a 2D news app and the App Space SDK may be executed to fulfill IPC so that whenever 3D interaction is desired, the callback is provided to the 3D app and then the 3D app processes the callback however it has been programmed to download a 3D model indicated via the 2D news app. Thus, the 3D app developer does not have to deal with building the underlying news app again but for 3D since the existing 2D news app is being used, and instead may just write code for the IPC and whatever 3D-specific processes they want the 3D app itself to execute.

Thus, more generally a 3D app may use App Space as an SDK to internally intercept data from an Internet browser 2D app or a webview executing in a non-Internet browser 2D app. Thus, if a 2D app developer wanted to do something in 3D based on a user clicking on certain button, the 2D app developer may configure the 2D app to seamlessly pass back certain data to the 3D app via the IPC, where the 3D app has initially used a webview to present the 2D app's content in 3D. In other words, a 2D app developer may build a 2D screen so that whenever a user browses a given website and finds a 3D model they wish to view, they may select a "view in 3D" button adjacent to the 2D representation of the 3D model so that when the user selects the button (e.g., using a 3D interaction method such as one of the ones discussed above), the 2D app may conditionally check that the user is trying to download a 3D model by intercepting the URL that is being rendered/selected and pass that data to App Space as the action the user is attempting to perform so that there is a bridge communication between the 2D app and the possibly integrated App Space SDK/3D app. In this way, the 2D app may signal to App Space that the user is trying to open a particular 3D model. Knowing this model is being downloaded, App Space/the 3D app may download and open the 3D model in 3D space.

Thus, the 2D app developer may continue to operate within the Android (or other 2D) world and does not need to get into how the 3D model might be rendered in 3D or how corresponding model interaction is done in 3D. Instead, the 2D app developer may still just focus on 2D development. As for the 3D app developer, the 3D app developer may include App Space as development tool (e.g., import into Unity as an SDK) and use screens that the 2D app has provided to implement a call-back that the 2D app instigated so that 3D developer may add some relatively minimal lines of code to then show the 3D model selected through the 2D app but in 3D space at the headset. Thus, the 3D app may open any 3D model published online by a third party.

Accordingly, App Space may provide an interface for a 3D app developer to implement so that an Android API or other API that does asynchronous communication can provide the callback to App Space to indicate what the end-user themselves is doing (selecting a 3D model for rendering in 3D space).

Thus, as stated above the App Space SDK may be integrated into the 3D app itself. The 3D app may be built on top of the App Space SDK so that a 3D model viewer can be built on top of App Space with whatever customization the 3D app developer desires for the handling/rendering of 3D models.

Figure 5:
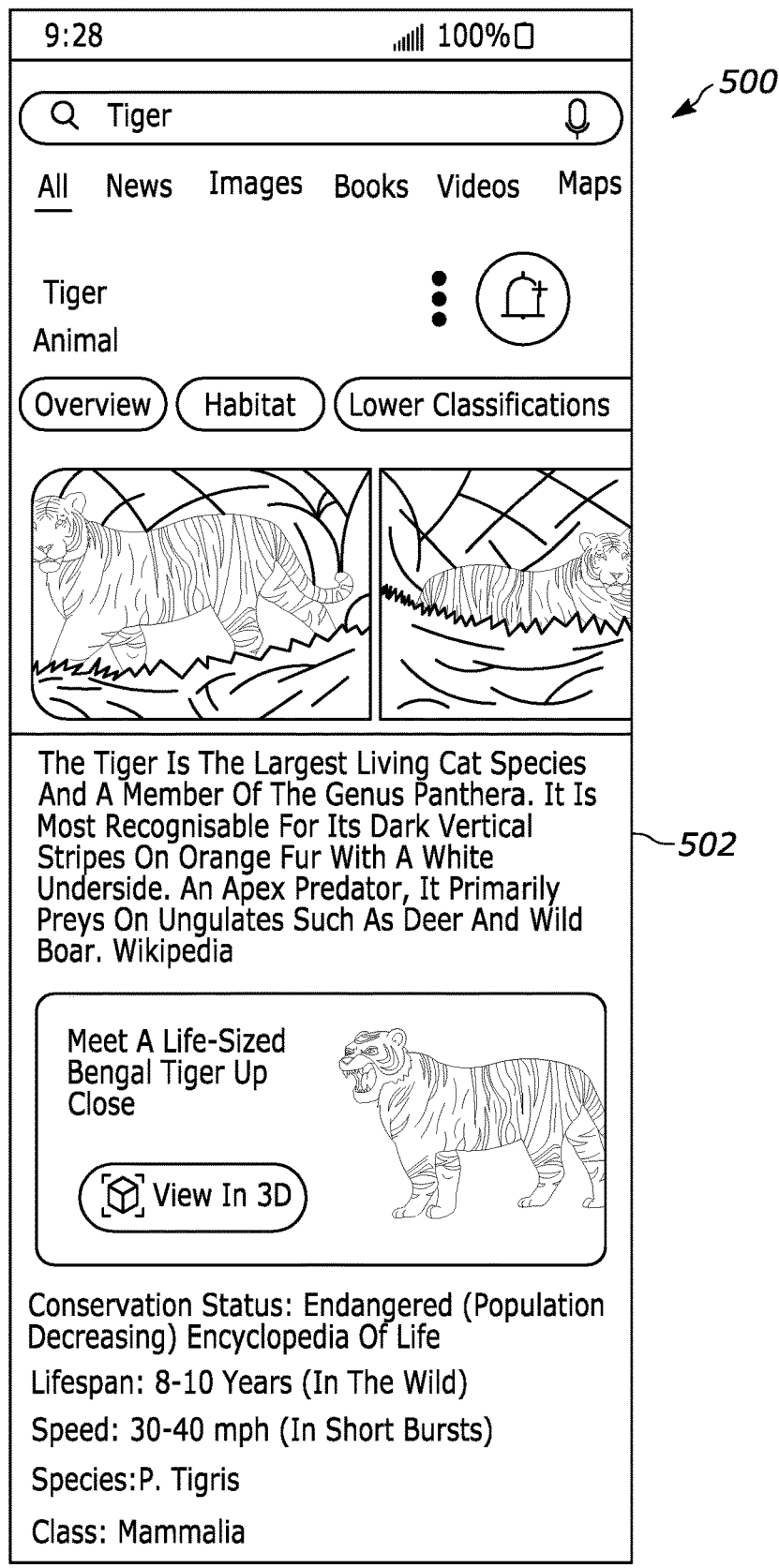
FIG. 5 shows an example search result with a "view in 3D selector" as presented on a mobile phone display consistent with present principles.

With the foregoing in mind, reference is now made to FIG. 5. Suppose an end user used their smartphone to perform a Google search for "tiger" using the smartphone's web browser like Google's Chrome or Mozilla's Firefox. In response, the search engine may return search results and information 502 on tigers as presented on a graphical user interface (GUI) 500 as part of the browser. As also shown in FIG. 5, owing to the smartphone having augmented reality (AR) and/or virtual reality (VR) presentation capabilities to present 3D models/renderings on its 2D display, the browser may present a selector 504 that the user may select to command the smartphone to present a 3D model of a tiger hosted by Google itself on its 2D display. This may be done so that the user can interact with the 3D model such as by changing zoom levels, rotating the 3D tiger to inspect it from different angles, and even control animated motions of the 3D tiger such as commanding it to roar or swipe with its paw.

Figure 6:
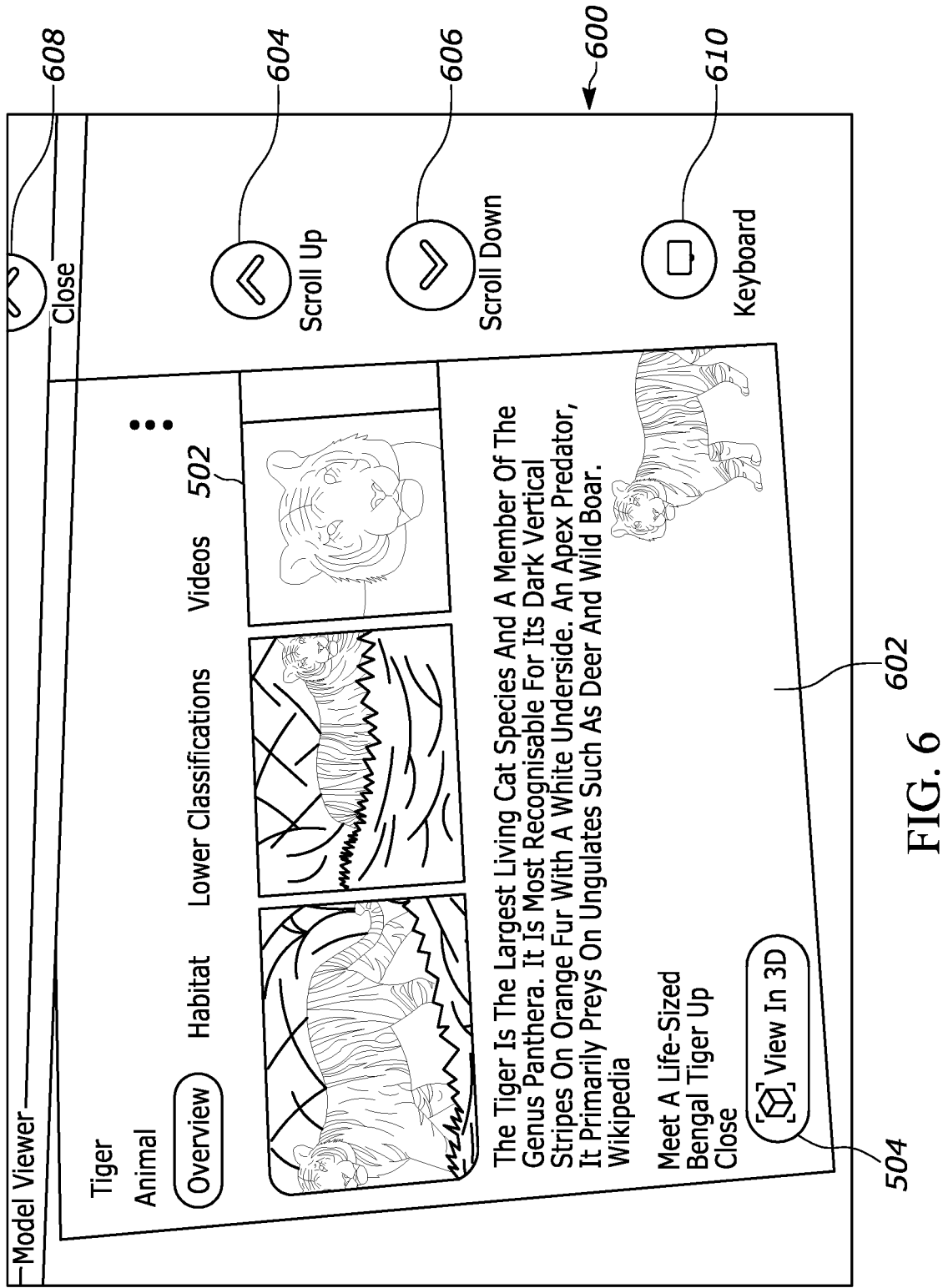
FIG. 6 shows the example search result with the "view in 3D selector" as presented on a 3D headset display consistent with present principles.

Contrast FIG. 5 to FIG. 6. FIG. 6 shows that a browser such as a webview presented through a 3D app is again presenting the search results 502 but on a headset display through a different GUI 600. As such, the search results 502 are presented as a 2D screen 602 of the underlying 2D app itself (e.g., webview or an Internet browser) but within the 3D GUI 600 so that the 2D screen 602 has a certain depth and, in some examples, may even have a spatial anchor so that it appears to the user to remain anchored to a real-world location that is viewable through the transparent display of the headset.

As also shown in FIG. 6, the search results 502 are scrollable using 3D up and down selectors 604, 606 presented as part of the GUI 600. Note further that the GUI 600 may also include a close selector 608 to close the 2D screen and a keyboard selector 610 to provide a command to the mobile device connected to the headset (and presenting the 3D environment at the headset) to present a keyboard. Different types of user inputs such as those described above in reference to FIG. 4 may be used to select one of the selectors 604-610 and to also select the selector 504 that is presented as part of the search results 502 themselves (e.g., based on coordinate conversion as also discussed above).

Thus, the user may scroll the search results via the selectors 604, 606 until the selector 504 is presented to in turn select the selector 504. Coordinate conversions may then be executed as described above to pass the selection input to the 2D app that the selector 504 has been selected. This in turn may instigate a callback based on execution of the underlying 2D app being used to access the search results 502 as described more generally above.

FIG. 7 then shows that after the 3D app (e.g., a 3D model viewer) has downloaded the 3D model of the tiger as deeplinked to the selector 504, the mobile device may control the headset to stereoscopically render the associated 3D tiger model 710 in 3D as part of the GUI 600. Furthermore, note that in addition to updating the GUI 600 to show the 3D model 710 of the tiger, the GUI 600 may also update to present 3D model movement selectors such as a move up/down/left/right selector 700 to move the model 710 around in 3D in 6 degrees of freedom, and a depth selector 702 to change the zoom level or depth of the 3D model 710. An exit selector 704 may also be presented to remove the selectors 700/702 and/or to remove the 3D model itself from presentation at the headset.

Figure 8:
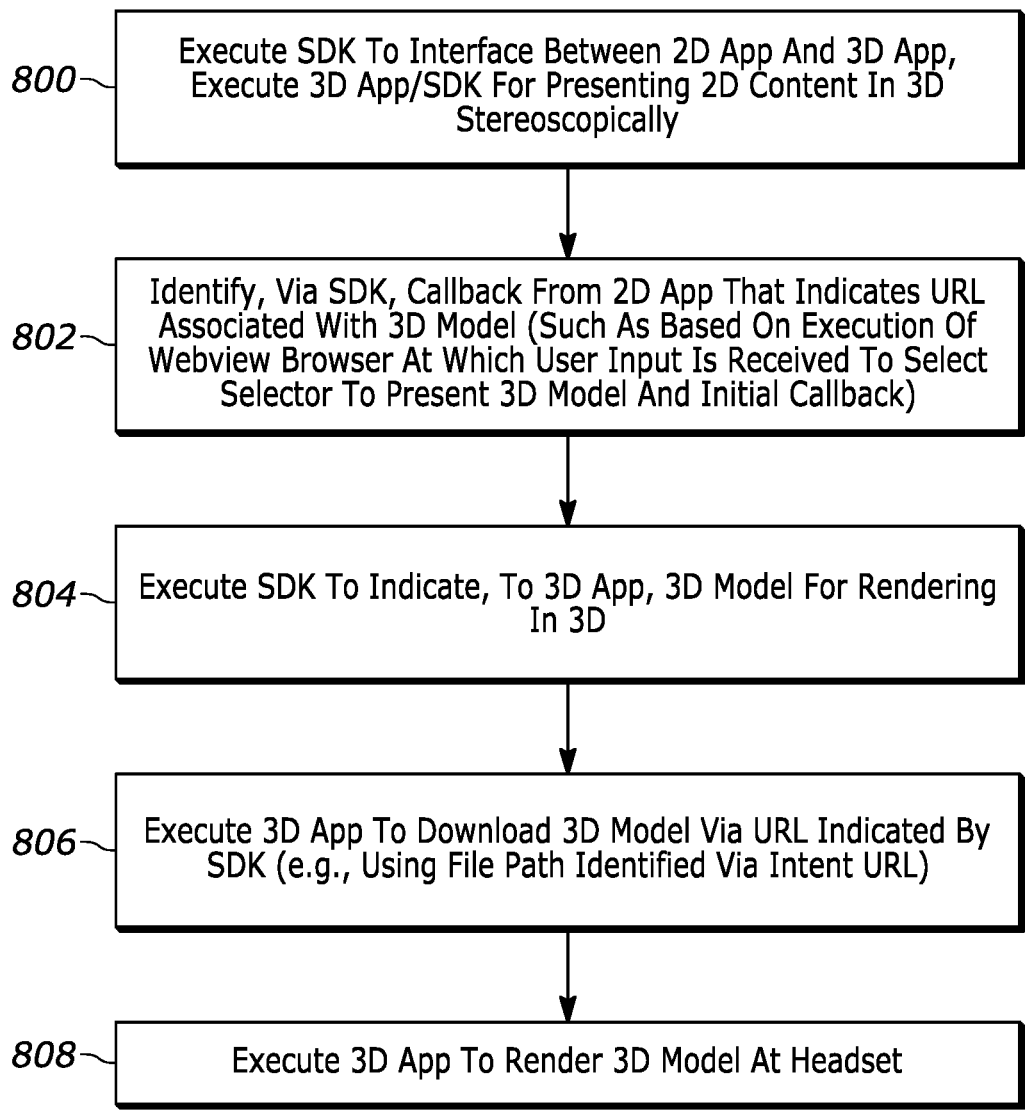
FIG. 8 illustrates example overall logic in example flow chart format that may be executed by one or more devices such as a mobile device consistent with present principles.

Referring now to FIG. 8, it shows example overall logic that may be executed consistent with present principles by a device such as the system 100, a mobile device, and/or a coordinating server in any appropriate combination. Beginning at block 800, the mobile device may execute an SDK, such as App Space as described above, at the mobile device. The SDK may be configured for interfacing presentation of content between 2D space and 3D space to thus present 2D content from a 2D app (as based in pixel coordinates) stereoscopically in 3D (as based in 3D texture coordinates established by e.g., bitmap images). Thus, in example implementations the device may also execute the 3D app itself (and/or integrated SDK) at block 800 to present 2D content from the 2D app in stereoscopic 3D at the connected headset. Further note that the SDK being executed may also be configured for interfacing between the 2D app and 3D app for a callback as described herein.

The logic may then move to block 802. At block 802 the device may identify, via the SDK, a callback from the 2D app. The callback may be generated as described above based on user input to present a 3D model, and the callback may indicate a uniform resource locator (URL) associated with the 3D model. For instance, the device may, via the SDK, execute a browser communicating with/establishing part of the 2D app itself (such as an Android WebView) to identify the callback based on user input that is received and that selects a selector presented via the 2D app (e.g., the selector 504 presented on the GUI 600 as described above) to initiate the callback based on receipt of the user input selecting the selector to ultimately present the associated 3D model.

From block 802 the logic may then proceed to block 804. At block 804 the device may execute the SDK to indicate, to the 3D app, the 3D model for rendering in 3D space. The logic may then proceed to block 806 where the device may execute the 3D app to download the 3D model via the URL as indicated by the SDK. For example, the URL may include an intent URL and the intent URL may be used to identify a file path at which the 3D model is downloadable by the 3D app. Thereafter, the logic may proceed to block 808 where the device may execute the 3D app to render the downloaded 3D model.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
    at least one processor; and
    storage accessible to the at least one processor and comprising instructions executable by the at least one processor to:
    execute a software development kit (SDK) to interface between a two-dimensional (2D) application (app) and a three-dimensional (3D) app, the SDK configured to render content of the 2D app in a spatial environment presented via the 3D app, the SDK also configured to convert first interactions with the rendered content and associated first coordinates for the first interactions into corresponding second interactions for the 2D app and associated second coordinates for the second interactions for use by the 2D app, the 2D app, the 3D app, and the SDK being different from each other;
    at runtime, present a graphical user interface (GUI) on a display via the 2D app, the GUI comprising a selector, the selector being selectable to render a 3D model;
    identify user selection of the selector;
    based on selection of the selector, intercept, using the SDK, a callback from the 2D app, the callback indicating a uniform resource locator (URL) associated with the 3D model;
    based on intercepting the callback from the 2D app using the SDK, prevent the 2D app from rendering the 3D model in the 2D app and execute the SDK to indicate, to the 3D app, the 3D model for rendering in 3D space using the 3D app; and
    execute the 3D app to render the 3D model.

2. The device of claim 1, wherein the instructions are executable to:
    execute the 3D app to download the 3D model via the URL as indicated by the SDK.

3. The device of claim 2, wherein the URL comprises an intent URL, and wherein the instructions are executable to:
    use the intent URL to identify a file path at which the 3D model is downloadable; and
    execute the 3D app to download the 3D model via the file path.

4. The device of claim 1, wherein the instructions are executable to:
    execute a browser via the SDK to intercept the callback, the browser communicating with the 2D app.

5. The device of claim 1, wherein the SDK is integrated into the 3D app.

6. The device of claim 1, wherein the 2D app is configured to present visual content in pixel coordinates, and wherein the 3D app is configured to present 3D content stereoscopically.

7. The device of claim 6, wherein the 3D app is configured to present 3D content stereoscopically in texture coordinates.

8. The device of claim 1, wherein the selector is presented on the GUI as part of search results related to a particular object, the 3D model indicating the particular object.

9. The device of claim 1, wherein the instructions are executable to:
    receive user input to interact with the 3D model; and
    based on the user input, animate the 3D model using the 3D app.

10. The device of claim 9, wherein the user input comprises input to change zoom levels for the 3D model.

11. The device of claim 9, wherein the user input comprises rotating the 3D model to different angles.

12. The device of claim 9, wherein the user input comprises animating the 3D model to perform a predetermined action associated with a particular object.

13. A method, comprising:
    executing a software development kit (SDK) to interface between a two-dimensional (2D) application (app) and a three-dimensional (3D) app to render content of the 2D app in a spatial environment presented via the 3D app, the SDK also configured to convert first interactions with the rendered content and associated first coordinates for the first interactions into corresponding second interactions for the 2D app and associated second coordinates for the second interactions for use by the 2D app, the 2D app, the 3D app, and the SDK being different from each other;

at runtime, presenting a graphical user interface (GUI) on a display via the 2D app, the GUI comprising a selector, the selector being selectable to render a 3D model;

identifying user selection of the selector;

based on selection of the selector, intercepting, using the SDK, a callback from the 2D app, the callback indicating a uniform resource locator (URL) associated with the 3D model;

based on intercepting the callback from the 2D app using the SDK, executing the SDK to indicate, to the 3D app, the 3D model for rendering in 3D space using the 3D app; and executing the 3D app to render the 3D model.

14. The method of claim 13, comprising:

receiving user input to interact with the 3D model; and based on the user input, animating the 3D model using the 3D app.

15. The method of claim 14, wherein the user input comprises input to change zoom levels for the 3D model.

16. The method of claim 14, wherein the user input comprises rotating the 3D model to different angles.

17. The method of claim 14, wherein the user input comprises animating the 3D model to perform a predetermined action associated with a particular object.

18. The method of claim 14, wherein the selector is presented on the GUI as part of search results related to a particular object, the 3D model indicating the particular object.

19. At least one computer readable storage medium (CRSM) that is not a transitory signal, the at least one computer readable storage medium comprising instructions executable by at least one processor to:

execute a software development kit (SDK) to interface between a two-dimensional (2D) application (app) and a three-dimensional (3D) app to render content of the 2D app in a spatial environment presented via the 3D app, the SDK also configured to convert first interactions with the rendered content and associated first coordinates for the first interactions into corresponding second interactions for the 2D app and associated second coordinates for the second interactions for use by the 2D app, the 2D app, the 3D app, and the SDK being different from each other;

at runtime, present a graphical user interface (GUI) on a display via the 2D app, the GUI comprising a selector, the selector being selectable to render a 3D model;

identify user selection of the selector;

based on selection of the selector, intercept, using the SDK, a callback from the 2D app, the callback indicating a uniform resource locator (URL) associated with the 3D model;

based on intercepting the callback from the 2D app using the SDK, execute the SDK to indicate, to the 3D app, the 3D model for rendering in 3D space using the 3D app; and execute the 3D app to render the 3D model.

20. The at least one CRSM of claim 19, wherein the instructions are executable to:

receive user input to interact with the 3D model; and animate an animate object represented by the 3D model to move a body part of the animate object.

* * * * *